United States Patent
Marfil-Romero et al.

(10) Patent No.: US 10,953,570 B2
(45) Date of Patent: Mar. 23, 2021

(54) DEVICE AND METHOD FOR FEEDING MOLTEN PLASTIC MATERIAL INTO A MOLDING CAVITY

(71) Applicant: Ultrasion SL, Barcelona (ES)

(72) Inventors: Jose A. Marfil-Romero, Barcelona (ES); Marcel Janer-Angelet, Barcelona (ES); Francisco Javier Planta-Torralba, Barcelona (ES)

(*) Notice: Subject to any disclaimer, the term of this patent is extended or adjusted under 35 U.S.C. 154(b) by 591 days.

(21) Appl. No.: 15/539,493

(22) PCT Filed: Dec. 4, 2015

(86) PCT No.: PCT/IB2015/002280
§ 371 (c)(1),
(2) Date: Jun. 23, 2017

(87) PCT Pub. No.: WO2016/103016
PCT Pub. Date: Jun. 30, 2016

(65) Prior Publication Data
US 2017/0368720 A1   Dec. 28, 2017

(30) Foreign Application Priority Data

Dec. 23, 2014 (EP) .................................. 14380040

(51) Int. Cl.
| | |
|---|---|
| *B29C 31/04* | (2006.01) |
| *B29B 13/02* | (2006.01) |
| *B29C 45/58* | (2006.01) |
| *B29C 35/02* | (2006.01) |
| *B29C 45/02* | (2006.01) |

(Continued)

(52) U.S. Cl.
CPC .......... *B29C 31/041* (2013.01); *B29B 13/022* (2013.01); *B29C 35/0261* (2013.01); *B29C 45/021* (2013.01); *B29C 45/585* (2013.01); *G05D 19/02* (2013.01); *G05D 23/1927* (2013.01)

(58) Field of Classification Search
CPC ......................... B29C 45/021; B29C 35/0261
See application file for complete search history.

(56) References Cited

U.S. PATENT DOCUMENTS

2007/0224303 A1* 9/2007 Vasapoli ............. B29C 45/2701
425/146

FOREIGN PATENT DOCUMENTS

| EP | 2189264 A1 * | 5/2010 | ........... B29B 13/022 |
|---|---|---|---|
| EP | 2189264 B1 * | 5/2012 | ........... B29B 13/022 |

OTHER PUBLICATIONS

Michaeli (Microsystem Technologies 8 (2002) 55-57) (Year: 2002).*

* cited by examiner

*Primary Examiner* — Joel G Horning
(74) *Attorney, Agent, or Firm* — Eugenio J. Torres-Oyola; Victor M. Rodriguez-Reyes; Rafael Rodriguez-Muriel (57) ABSTRACT

The device for feeding molten plastic material into a molding cavity (30) includes a melting chamber (20) in which metered solid plastic material is introduced, a sonotrode (10) provided for tightly inserting a portion thereof into said melting chamber (20), causing the plastic material to melt by means of vibration, and relative movement of the sonotrode (10) and melting chamber (20) allows driving the molten plastic material inside a molding cavity (30) communicated with said melting chamber (20), the device including resistance sensors (40) allowing an electronic control device (50)

(Continued)

to know the resistance that the plastic material has against the movement of the sonotrode (10).

6 Claims, 6 Drawing Sheets

(51) Int. Cl.
*G05D 19/02* (2006.01)
*G05D 23/19* (2006.01)

DEVICE AND METHOD FOR FEEDING MOLTEN PLASTIC MATERIAL INTO A MOLDING CAVITY

TECHNICAL FIELD

The present invention relates to a device and method for feeding molten plastic material into a molding cavity, the plastic material being loaded in a metered way into a melting chamber where it is melted by means of a portion of a sonotrode movable with respect to said melting chamber, the movement and activation of the mentioned sonotrode causing the molten plastic material to be introduced into the molding cavity in communication with said melting chamber.

STATE OF THE ART

Document EP2189264 particularly discloses a device provided for melting plastic material by means of vibration of a sonotrode equipped with a portion inserted into a melting chamber from which the plastic material is driven into a molding cavity by means of movement of the portion of the sonotrode within the melting chamber. This document envisages regulating the energy supplied to the plastic material through vibration of the sonotrode, taking into account the feeding characteristics and amount and/or the type of plastic material used, for operating said regulation in a manner combined with all these parameters.

Document WO2004024415 describes a device for injecting molten plastic material using in this case a sonotrode with a portion statically inserted into the melting chamber. Said portion of the sonotrode is in direct contact with the plastic material and is provided for improving melt flow characteristics of the plastic material, allowing it to be driven and inserted into the molding cavity in an improved manner.

Document EP2591901 describes a feeding device for feeding solid plastic material which allows supplying a controlled dose of granular plastic material by counting and weighing granules, providing useful information for calibrating a melting device for melting solid plastic material, incorporating a sonotrode provided to act in a chamber loaded by said feeding device.

A sonotrode with an access for air defined through a portion thereof for cooling an operating area of said sonotrode, specifically when welding plastic material, is also known, for example, through patent application EP 1000732.

DISCLOSURE OF THE INVENTION

The present invention relates to a device for feeding molten plastic material into a molding cavity, said device comprising a melting chamber communicated with:
- a portion, susceptible to vibrating, of a sonotrode of an ultrasonic transducer;
- an access for feeding solid plastic material, said plastic material being able to be in a granular format, in powder format, in bar format or another morphology, and
- at least one outlet opening for supplying molten plastic material to said molding cavity;
said device including translation means for providing relative movement between the portion of the sonotrode and the melting chamber, regulating the position of the tip of the portion of the sonotrode within the melting chamber.

It is therefore envisaged that said melting chamber can be at least partially filled with solid plastic material (material known in the art as pellets), for example, preferably having a approximately homogenous grain size distribution, supplied through the feed access.

Alternatively, other feed systems specific for different formats of the solid plastic material, for example passages, a transfer, etc., can be envisaged.

The mentioned sonotrode has a portion which can be inserted into said melting chamber, said insertion being able to be regulated by means of the mentioned translation means.

The portion of the sonotrode inserted into the melting chamber comes into contact with the solid plastic material deposited therein and is susceptible to melting it by means of ultrasonic vibration produced by the ultrasonic transducer and transmitted through said portion of the sonotrode. In order to melt the plastic material, vibration at frequencies between 10 and 50 kHz is considered optimal but non-limiting.

Translation means are herein understood as a device that allows guided axial movement, operated automatically by means of, for example, a mechanism connected to an actuator, such as a rotary or linear electric motor, an electromagnet, a servomotor, a piston, or another similar actuator, which preferably moves the sonotrode with respect to a stationary melting chamber, although moving the melting chamber with respect to a stationary sonotrode is also contemplated. Use of a servo-hydraulic or pure hydraulic actuation is not ruled out.

Relative movement between the sonotrode and the melting chamber, with the plastic material inside the chamber being in molten state, drives said molten plastic material through the outlet opening of the melting chamber, determining injection thereof into the molding cavity.

Implementation of the proposed invention requires the device for the metered feeding of molten plastic material into a molding cavity to additionally have resistance sensors provided for detecting the resistance against movement which a plastic material, loaded by way of metering in said melting chamber through said access, has against the relative movement between the portion of the sonotrode and said melting chamber.

The invention also envisages an electronic control device for regulating said translation means based at least on the information provided by said resistance sensors.

The resistance sensors allow detecting the force with which the plastic material in contact with the portion of the sonotrode resists against movement thereof. This measurement allows knowing when the portion of the sonotrode comes into contact with said plastic material, and also the fluidity of said plastic material when it is melted, because the greater the fluidity the lower the force it will have against movement of the sonotrode, and vice versa.

All this information together with knowledge of the relative position between the sonotrode and the melting chamber, allow the electronic control device to know the volume of the melting chamber occupied by granules of plastic material or molten plastic material, or the degree of fluidity thereof.

Knowing the fluidity of the plastic material also allows the electronic control device to regulate the translation means, adapting operation of said means to the fluidity of the molten plastic material, achieving improved feeding of the molding cavity.

The resistance sensors can be of many types because said force can be detected in a number of ways. By way of non-limiting example, the resistance sensors could detect power consumption of the translation means in the event that they are electrically actuated, therefore detecting the work that said translation means have to do to overcome resistance of the plastic material. Another example can be a pressure sensor arranged in the sonotrode, booster segment, transducer, or any other part of the vibrational component, or in the support of the melting chamber, which thereby allows detecting variations in pressure caused by a greater or lesser resistance force of the material plastic against the forward movement of the portion of the sonotrode. An additional non-limiting example is to arrange pressure sensors that measure the pressure of the driving fluid in the event that the translation means are operated by a hydraulic or pneumatic actuator, which also allows detecting variations in the force applied by the plastic material against the forward movement of the sonotrode. Many other examples of resistance sensors can be implemented without modifying the invention, as will be obvious for a person skilled in the art.

The information provided by said resistance sensors is transmitted to the electronic control device which controls and regulates the translation means. Based on the information received from the resistance sensors, and based on a programming implemented in said electronic control device, said electronic control device controls the operating parameters of the translation means to produce correct metered feeding of molten plastic material into the molding cavity.

It will be understood that the mentioned electronic control devices can be the following, for example, or another equivalent solution, as will be obvious for a person skilled in the art:

An electronic device, such as, for example, a programmable logic controller or the like, which can be implemented in the form of a circuit or a computing board, equipped with data inputs and outputs, a memory, and implementing calculating operations; said device can be fed with data from sensors, and said calculating operations allow providing control orders.

Said electronic control device will include a power source and can comprise data display means, such as a screen, for informing an operator. It can also comprise means which allow said operator to change the configuration of the electronic control device, such as, for example, a keyboard, buttons, an options menu, etc. These devices can be local or remote.

According to a preferred embodiment, the device for the metered feeding of molten plastic material into a molding cavity furthermore has feed sensors provided for detecting the amount of granules and/or the weight of the solid plastic material fed into the melting chamber. This allows knowing the exact metering of plastic material by weight and by the number of granules, but not the volume said granules will occupy once they are deposited in the melting chamber because the granules can contain bubbles changing their density, and because they will be randomly arranged; however, that information was obtained by the electronic control device by means of the data provided by the resistance sensors which allow knowing when the tip of the sonotrode (the position of which is known by the electronic control device) comes into contact with the solid plastic material. Therefore, the metering of solid plastic material by weight, by volume and by number of granules is perfectly controlled by means of said feed sensors together with resistance sensors.

Optionally or additionally, ambient sensors provided for detecting ambient temperature and/or humidity can also be provided. The possibility of including operation sensors provided for detecting one or several of the following parameters is also contemplated:

relative position of the portion of the sonotrode with respect to the melting chamber;
temperature of the sonotrode;
temperature of the portion of the sonotrode;
temperature of the melting chamber;
temperature of the molding cavity
temperature of the plastic material.

The information obtained by these resistance sensors or by the feed, ambient and/or operation sensors is supplied to the electronic control device, which controls actuators of the device which allow regulating one or several of the following operating parameters of the device:

activation of the sonotrode
relative position of the portion of the sonotrode with respect to the melting chamber upon activating vibration of the sonotrode;
activation time of the sonotrode;
vibration frequency of the sonotrode;
vibration amplitude of the sonotrode;
relative movement speed of the portion of the sonotrode with respect to the melting chamber;
acceleration of the relative movement of the portion of the sonotrode with respect to the melting chamber;
pressure applied on the plastic material contained in the melting chamber by the relative movement of the portion of the sonotrode with respect to the melting chamber;

The device for feeding molten plastic material optionally includes cooling means outside the portion of the sonotrode provided for putting a coolant fluid in thermal contact with the portion of the sonotrode, producing cooling thereof.

According to one embodiment, the mentioned cooling means include a coolant gas diffuser arranged around the inlet of the portion of the sonotrode in the melting chamber, provided for diffusing coolant gas over a portion of the sonotrode extracted from said melting chamber. In another embodiment, the mentioned cooling means include a coolant fluid circuit arranged around at least one portion of the melting chamber, provided for allowing the flow of a coolant fluid therethrough, cooling at least one portion of the melting chamber in thermal contact with the portion of the sonotrode.

Activation of said cooling means can also be controlled by the electronic control device based on the data obtained from the resistance sensors or feed, ambient and/or operation sensors.

Even though neither the portion of the sonotrode nor the melting chamber include heating means, vibration and friction cause the portion of the sonotrode to heat up. Excessive heating of said portion of the sonotrode can cause the molten plastic material to stick to said portion. The cooling cycle serves to prevent this phenomenon.

Regulating these parameters allows precisely controlling the amount of energy applied to the plastic material because both vibration (frequency and time) and movement (speed, acceleration and pressure) are ways of applying energy. Excessive application of energy to all or part of the plastic material can cause it to degrade; therefore, it is preferable to precisely know the amount and position of the solid plastic material arranged in the melting chamber so that the electronic control device can precisely regulate the application of energy, achieving correct melting of said plastic material without degrading it. Therefore, the electronic control device includes in its programming ranges that indicate the minimum energy necessary for causing the plastic to melt, and the maximum energy causing it to degrade, said ranges being adapted to different circumstances detected by means of the different sensors provided.

According to another embodiment, the electronic control device can additionally have a user interface which allows an operator to enter in said electronic control device information relating to the type of plastic material and/or the pellet format to be used, which allows improving regulation of the operating parameters.

It is additionally envisaged that the electronic control device has a memory equipped with different configurations of the operating parameters of the device relating to different types of plastic material and/or different usable granule formats, allowing said electronic control device to regulate the aforementioned operating parameters also based on this information contained in the memory, thereby achieving even more precise regulation based on the information contained in said memory.

According to a preferred embodiment of the device for feeding molten plastic material into a molding cavity, the translation means are electrically actuated and the resistance sensors detect the consumption of said translation means during actuation thereof.

The present invention also proposes a method for feeding molten plastic material into a molding cavity by means of a device such as the one described above, equipped with pressure sensors and an electronic control device capable of regulating translation means.

Said method comprises the following steps, forming a production cycle:
a) loading metered plastic material in said melting chamber through said access for feeding plastic material;
b) activating the sonotrode, causing the plastic material to melt;
c) actuating the translation means providing relative movement between the portion of the sonotrode and the melting chamber, inserting the tip of the portion of the sonotrode further into the melting chamber and pushing the molten plastic material inside the molding cavity through the outlet opening.

The proposed method is characterized in that before performing step b), a first relative movement is produced between the portion of the sonotrode and the melting chamber, inserting the tip of the portion of the sonotrode into the melting chamber until said resistance sensors detect that the plastic material inserted into the melting chamber resists against forward movement of the portion of the sonotrode, thereby detecting contact of the portion of the sonotrode with said plastic material, and providing an indication relative to the volume of the melting chamber occupied by the plastic material. That information is communicated to the electronic control device which regulates, based at least on the data provided by said resistance sensors, activation of the sonotrode and actuation of the translation means of step c).

This allows the electronic control device to know the volume of the melting chamber occupied by the granular material plastic, and it allows regulation of vibration and of relative movement between the sonotrode and said melting chamber produced by the translation means, to be adapted depending on said information in order to apply an amount of energy to the plastic material that allows it to melt without causing it to degrade, being maintained within pre-established energy ranges included in the electronic control device.

According to an alternative embodiment of the method, the electronic control device performs said regulation of the operating parameters also based on information supplied by feed sensors, by ambient sensors and/or by operation sensors. Feed sensors are provided for detecting the amount of granules and/or the weight of the solid plastic material fed into the melting chamber; ambient sensors are provided for detecting ambient temperature and/or humidity; and operation sensors are provided for detecting one or several of the following parameters:
relative position of the portion of the sonotrode with respect to the melting chamber;
temperature of the sonotrode;
temperature of the portion of the sonotrode;
temperature of the melting chamber;
temperature of the molding cavity.

With the information provided by these sensors, the electronic control device can more closely regulate operating parameters, achieving an improved melting of the plastic material, and resulting in molded plastic parts having better quality.

According to an alternative embodiment of the method, the electronic control device regulates, based at least on the data provided by said resistance sensors, one or several of the following operating parameters:
relative position of the portion of the sonotrode with respect to the melting chamber upon activating vibration of the sonotrode;
activation time of the sonotrode;
vibration frequency of the sonotrode;
relative movement speed of the portion of the sonotrode with respect to the melting chamber:
acceleration of the relative movement of the portion of the sonotrode with respect to the melting chamber;
pressure applied on the plastic material contained in the melting chamber by the relative movement of the portion of the sonotrode with respect to the melting chamber.

These parameters determine the amount of energy that is applied on the plastic material.

It is additionally envisaged that the electronic control device calculates the energy applied on the plastic material by means of the operating parameters and that it calculates the adjustment of said operating parameters so that said applied energy is enough to cause the plastic material to melt properly and not enough to cause the plastic material to degrade, based on the information obtained by the different sensors and based on a minimum and maximum energy range stored in said control device.

Therefore, the electronic control device analyzes all the information provided by the different sensors and determines the adjustment of each of the parameters, taking into account that the energy applied on the plastic material is suitable for causing it to melt without causing it to degrade according to minimum and maximum energy ranges that have been provided to said electronic control device through its programming.

According to an additional embodiment, at least one of the different sensors takes measurements and supplies information at different times of the production cycle, and the electronic control device performs different regulations of said operating parameters at different times of the production cycle, adjusting them at least according to the information provided by said at least one sensor. The operation adjustments can therefore be adapted to the variations sustained by the plastic material upon receiving said energy, such as its solid or fluid state, or its degree of viscosity, for example, regulation being variable and adaptable throughout the production cycle.

It has also been provided that the programmable electronic control device is capable of temporarily controlling and linking each and every one of the variables described above in an isolated manner, or using any other method (rulers, relationship curves, etc.), throughout the duration of the process.

It has also optionally been envisaged that when the electronic control device determines that the plastic material has reached a pre-established degree of fluidity by means of the information supplied by at least one of said sensors, vibration of the sonotrode stops without necessarily stopping the movement of the sonotrode with respect to the melting chamber, thereby reducing the energy supplied on the plastic material. This allows stopping fluidization of the plastic material at the desired level considered optimal for injecting it into the molding cavity.

Additionally, when the electronic control device determines that the molten plastic material has completely or almost completely filled the molding cavity by means of the information supplied by at least one of said sensors, vibration of the sonotrode is activated and/or pressure applied on the plastic material contained in the melting chamber by the relative movement of the portion of the sonotrode with respect to the melting chamber is increased.

The electronic control device detects if the molding cavity is filled or almost filled as a result of it knowing the volume of the molding cavity and the metering of plastic material, which allows knowing when the plastic material injected into the molding cavity from the melting chamber is enough to completely or almost completely (over 80%) fill it. Activating vibration of the sonotrode and/or increasing pressure at this time causes greater compaction of the molten plastic material arranged in the molding cavity, which prevents voids or deteriorations in the molded plastic part when solidified.

According to another envisaged embodiment of the method, the electronic control device determines between a first production cycle and a second production cycle if the temperature of the portion of the sonotrode obtained from operation sensors exceeds pre-established temperature ranges, performing a cooling cycle in that case.

According to one embodiment, said cooling cycle includes:
  placing the portion of the sonotrode in thermal contact with the cooling means;
  activating said cooling means.

Said cooling means can consist, for example, of a cold air generator, such as vortex equipment, connected to a coolant fluid distributing element arranged annularly around the inlet of the melting chamber, which allows simultaneously supplying a coolant fluid on the tip of the portion of the sonotrode from several orientations.

Other features of the invention will be seen in the following detailed description of an embodiment.

BRIEF DESCRIPTION OF THE DRAWINGS

The foregoing and other advantages and features will be better understood based on the following detailed description of an embodiment with reference to the attached drawings which must be interpreted in an illustrative and non-limiting manner, in which.

DETAILED DESCRIPTION OF AN EMBODIMENT

According to a non-limiting embodiment shown in the attached drawings, the device for feeding molten plastic material into a molding cavity 30 consists of a hollow melting chamber 20, which is cylindrical in the example, said melting chamber 20 being open at its upper end and closed at its lower end except for an outlet opening 22 provided at said lower end, which communicates said melting chamber 20 with a molding cavity 30.

In this embodiment, the melting chamber 20 also has an access 21 in the upper portion thereof for loading solid plastic material, communicating a side wall of said melting chamber 20 with a metered solid plastic material feeder. An automatic metering device controlled by an electronic control device 50 and equipped with feed sensors 41 allows performing said metered feeding in a precise manner.

A sonotrode 10 is arranged above said melting chamber 20 and is equipped with a projecting portion 11 having a size and shape that are complementary to those of the melting chamber 20, allowing said portion 11 to be introduced into said melting chamber 20 up to the lower end thereof, thereby coming into contact with any amount of solid plastic material arranged in said melting chamber 20 and thereby melting and driving any amount of molten plastic material from said melting chamber 20 to the molding cavity 30 through the mentioned outlet opening 22.

The mentioned molding cavity 30 can be open (see FIG. 5) to allow extracting the molded plastic parts after solidification, being ready for a new production cycle.

In this preferred embodiment shown in the attached drawings, the sonotrode 10 is mounted on a linear guide system allowing the guided vertical movement thereof, the portion 11 of the sonotrode 10 being aligned with the melting chamber 20, and electrically actuated translation means 12 allow performing vertical movement of the sonotrode in a controlled manner, the translation means 12 depicted in this embodiment being an electric motor.

Figure 1:
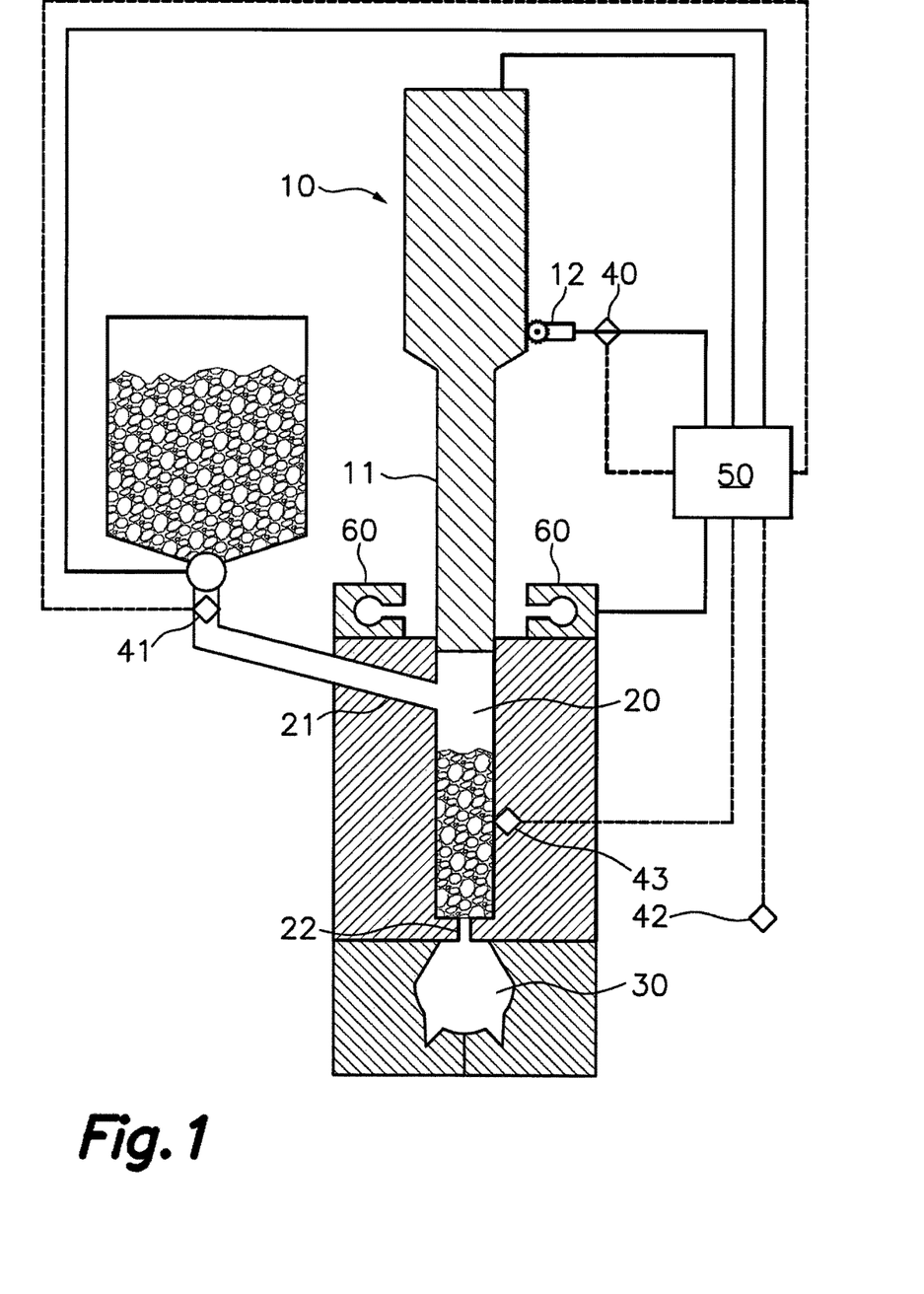
FIG. 1 schematically shows a device for feeding molten plastic material into a molding cavity in an initial step, in which solid plastic material has been supplied by way of metering into a melting chamber, located adjacent to and communicated with a molding cavity, showing a sonotrode with a portion facing said melting chamber, next to the inlet thereof, communication of sensors with the electronic control device being indicated with a dotted line.

As shown in the diagram of FIG. 1, the mentioned electric motor has a resistance sensor 40 based, for example, on control of the power consumption of the motor, connected with the electronic control device 50, allowing detection of the resistance which the plastic material deposited in the melting chamber 20 has against the movement of the portion 11 of the sonotrode 10 within the mentioned melting chamber 20, thereby deducing when the tip of the sonotrode 10 comes into contact with the solid plastic material and also the reaction generated by fluidity of the molten plastic material.

The mentioned electronic control device 50 also optionally has ambient sensors 42 provided for measuring ambient parameters such as ambient temperature and humidity, and operation sensors 43 provided for measuring different parameters of the device, such as the temperature of its components, or of the plastic material, or the relative position of the elements.

All these parameters can affect the melting and molding process of the plastic material, so it is important for the electronic control device 50 to obtain all the necessary information from said sensors 40, 41, 42, 43.

The electronic control device 50 can also act on different actuators of the proposed device, such as, for example, the sonotrode 110, the translation means 12, the cooling means 60, or the metering device feeding the melting chamber 20 with solid plastic material by way of metering.

Regulation of the actuation parameters of all these actuators is performed by the electronic control device 50 based on the information provided by the different sensors 40, 41, 42, 43.

Said electronic control device 50 can also regulate said operating parameters based on other information, for example, information contained in a memory of the electronic control device 50, or data relating to the type or format of the solid plastic material used, and said data could be stored in the memory and/or be entered by an operator through an interface.

Said memory will preferably store operation ranges that will indicate acceptable regulation maximums and minimums for each of the parameters, these ranges being able to be related and be variable, depending on some variable parameters, such as ambient temperature, the type of plastic material, geometry of the molding cavity 30 or of the outlet opening 22, etc. Said ranges can also be related and be variable depending on the time of the production cycle.

The electronic control device 50 additionally receives information about the minimum amount of energy necessary for causing the solid plastic material to melt (depending on type and format) and also about the maximum tolerable energy so as to not cause said plastic material to degrade (also depending on type and format), and it is able to know the amount of energy applied on said plastic material by actuation of the different actuators regulated by said electronic control device 50. This allows performing said regulation of the operating parameters to assure that the energy applied on the plastic material does not exceed the maximum limit at any time of the production cycle, thereby preventing the plastic material from degrading.

FIG. 1 schematically shows an initial step of the production cycle in which the electronic control device 50 has supplied a solid granular plastic material by way of metering to the melting chamber by means of the regulation of an automatic feeder.

Feed sensors 41 provide precise information to the electronic control device 50 about the weight and amount of granules introduced in the melting chamber 20.

Figure 2:
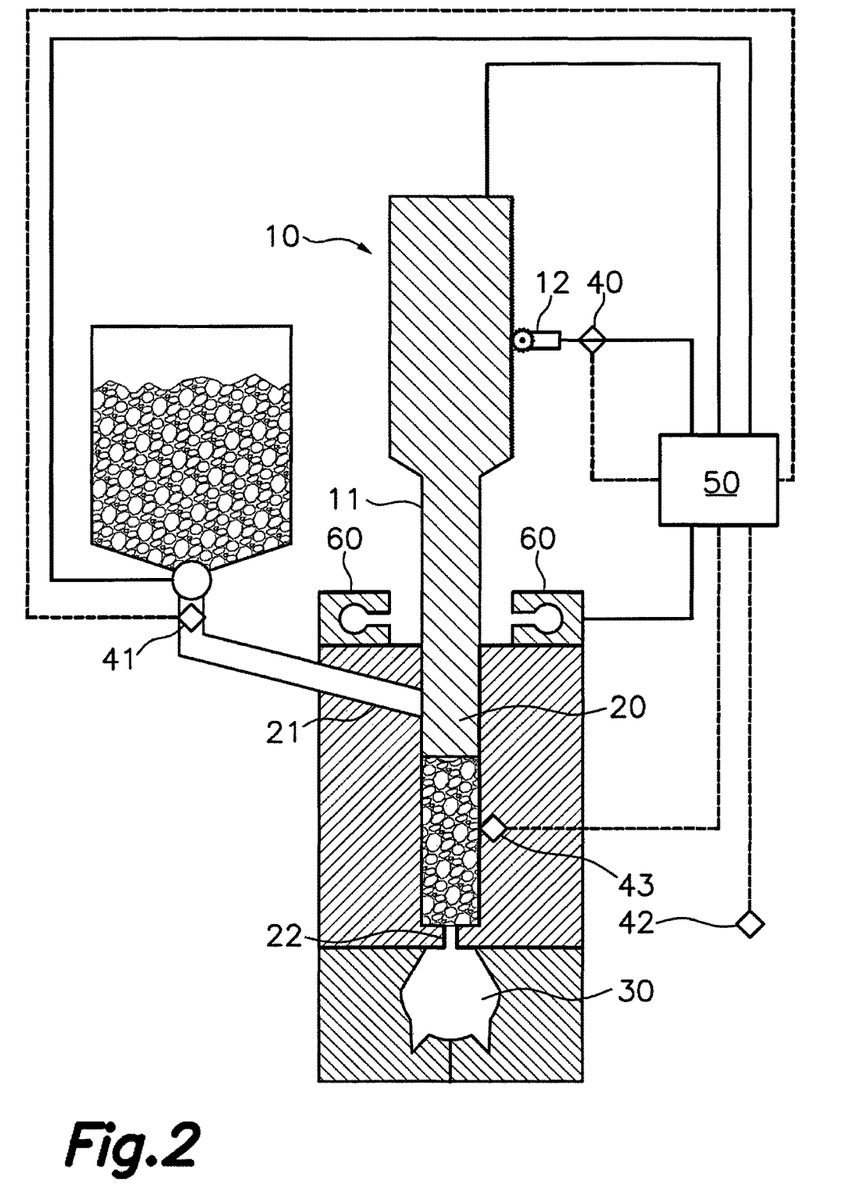
FIG. 2 is a view equivalent to FIG. 1 with the portion of the sonotrode moved until contacting the mentioned plastic material.

FIG. 2 shows the following step of the production cycle in which the translation means 12 are activated by the electronic control device 50, causing the portion 11 of the sonotrode 10 to be introduced in the melting chamber 20. When the tip of said portion 11 of the sonotrode 10 comes into contact with the plastic material, the resistance sensor 40 (resistance against the forward movement of the sonotrode) detects it and transmits said information to the electronic control device 50. This information makes it possible to know the volume of the melting chamber 20 occupied by the solid plastic material, and combined with the information received from the feed sensors 41, and optionally with information entered by an operator referring to the type and format of the solid plastic material that is fed, the electronic control device 50 is able to deduce if the plastic granules are more or less compacted upon being deposited in the melting chamber, which allows regulating the operating parameters in accordance with this information.

Figure 3:
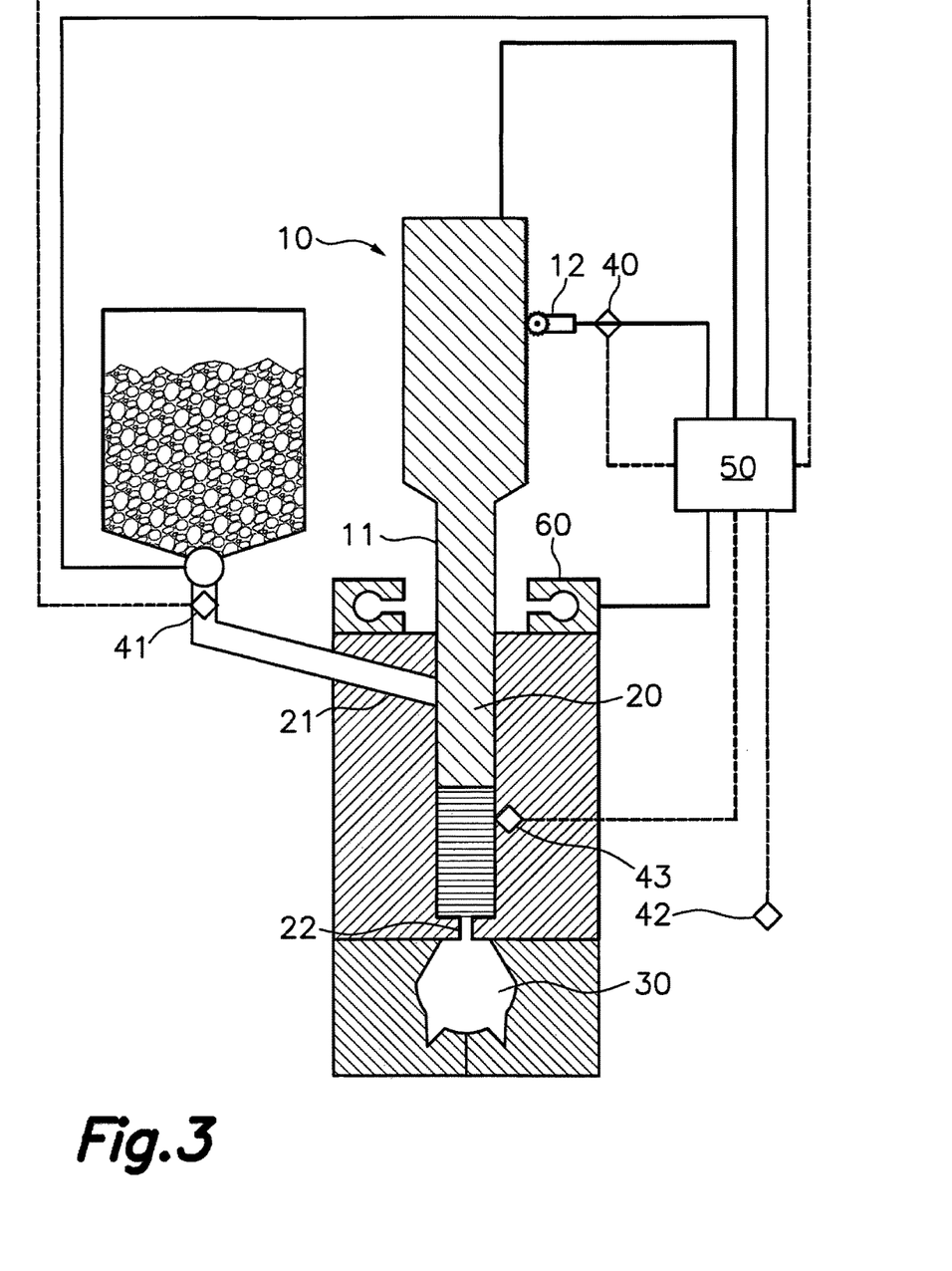
FIG. 3 shows a later step of melting the plastic material by means of activating the sonotrode.

FIG. 3 shows a later step of the production cycle in which vibration of the sonotrode has been actuated together with an additional movement of the sonotrode, causing the plastic material in the melting chamber 20 to melt and be compacted. At this state, resistance sensors 40 can determine the fluidity attained by the plastic material, but this information could also be deduced from a mean temperature of the molten plastic material provided by an operation sensor 43.

Based on this information, the electronic control device 50 can make additional adjustments both to the vibration and to the speed and acceleration of the movement of the sonotrode 10 in order to achieve and/or maintain desired fluidity conditions of the molten plastic material and for causing optimal introduction of the molten plastic material into the molding cavity 30.

Figure 4:
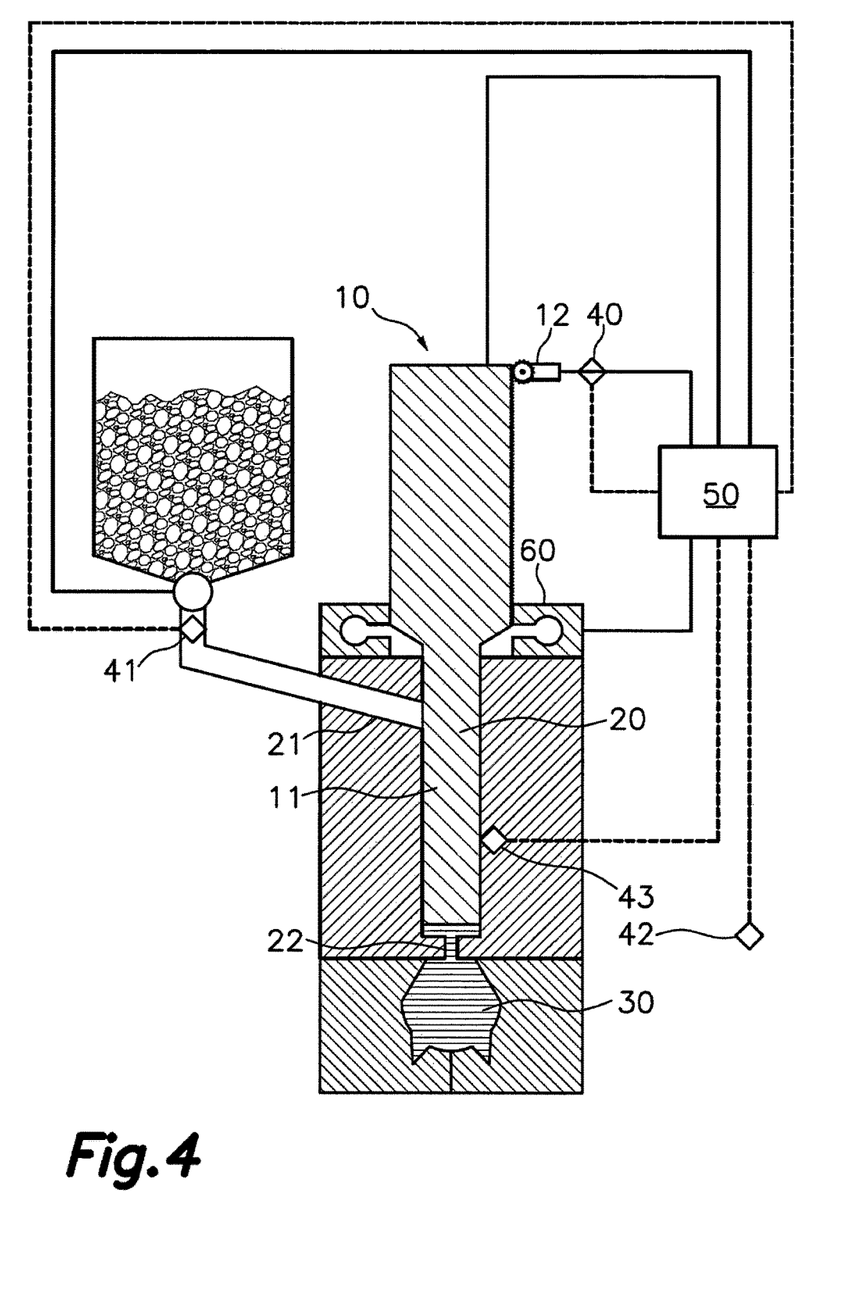
FIG. 4 shows introduction of the molten plastic material into the molding cavity by means of moving the sonotrode in said melting chamber.

FIG. 4 shows a final step of the production cycle in which the molding cavity 30 is already full or virtually full. At this time, the electronic control device 50 modifies vibration conditions and/or increases pressure, speed or acceleration of the sonotrode 10 in order to compact the molten plastic material inside the molding cavity 30.

After this step ends, the molded plastic material is cooled, causing it to harden, and then it is removed from the mold, the molding cavity 30 once again being ready to start production cycle again.

After the production cycle ends, the electronic control device 50 determines if the temperature of the portion 11 of the sonotrode 10 is below a pre-established parameter based on the data provided by the operation sensors 43. If it is below said pre-established parameter, a new production cycle can begin, but if it is not, a cooling cycle is required.

Figure 5:
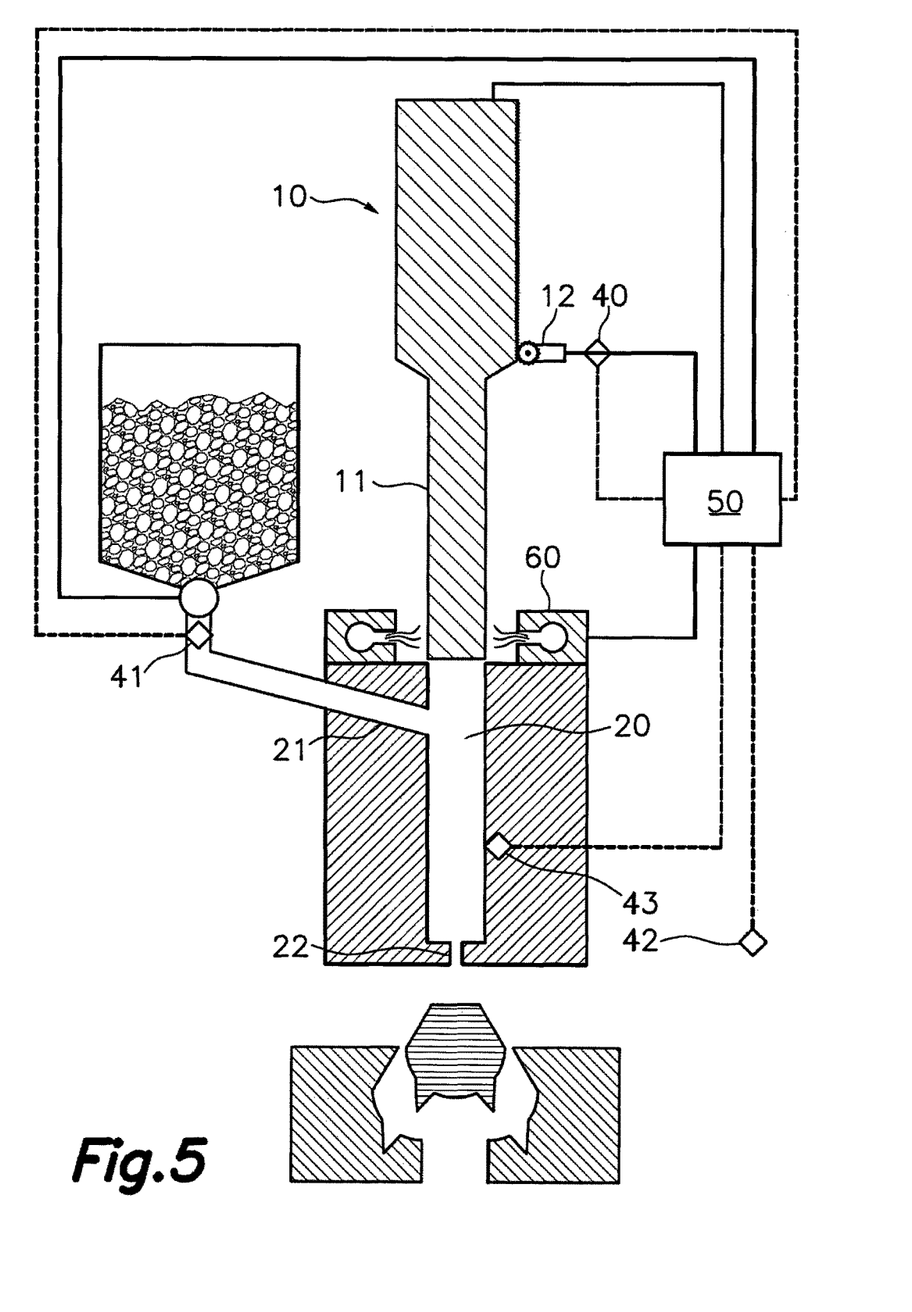
FIG. 5 shows a position of the sonotrode outside the melting chamber and subjected to a coolant fluid by blowing.
Figure 6:
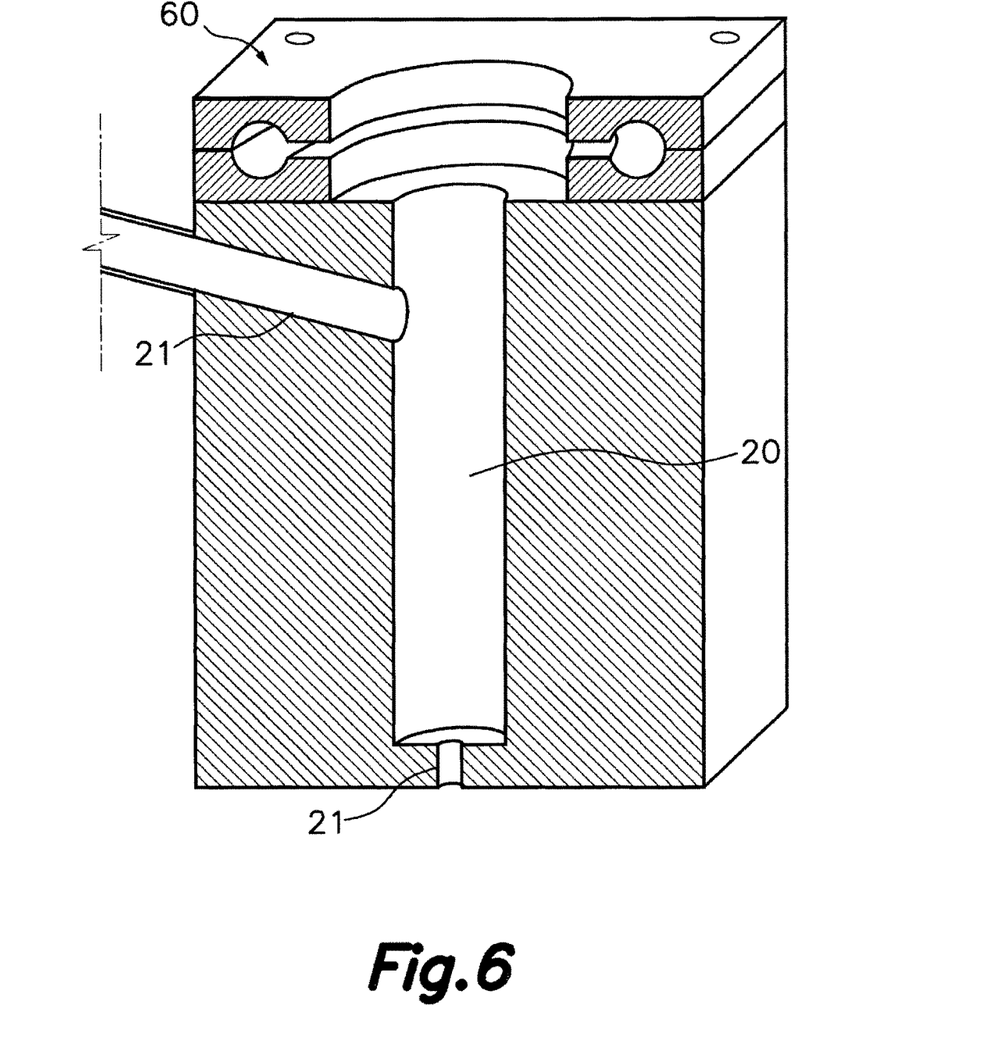
FIG. 6 illustrates an embodiment of a coolant fluid distributing element of the sonotrode.

Said cooling cycle is shown in FIG. 5, where it can be seen how the portion 11 of the sonotrode 10 has been extracted from the melting chamber 20, facing cooling means 60 which in this embodiment (see the detail in FIG. 6) consist of a diffuser provided for driving a coolant gas over said portion 11 of the sonotrode 10 from a region located around same.

The invention claimed is:

1. A device for feeding molten plastic material into a molding cavity, said device comprising a melting chamber communicated with:
    a portion, susceptible to vibrating, of a sonotrode of an ultrasonic transducer;
    an access for loading a solid plastic material; and
    at least one outlet opening of the melting chamber for supplying molten plastic material to said molding cavity;
    said device including translation means for providing relative movement between the portion of the sonotrode and the melting chamber, regulating the position of a tip of the portion of the sonotrode within the melting chamber;
    wherein the device further comprises:
        resistance sensors provided for detecting the resistance against movement which a plastic material, loaded by way of metering in said melting chamber through said access, has against the relative movement between the portion of the sonotrode and said melting chamber;

a programmable electronic control device for regulating said translation means based at least on the information provided by said resistance sensors; and cooling means for cooling the portion of the sonotrode, including a coolant gas diffuser arranged around an inlet of the portion of the sonotrode in the melting chamber, provided for diffusing said coolant gas over a portion of the sonotrode extracted from said melting chamber.

2. The device according to claim 1, further comprising:

feed sensors provided for detecting and measuring the amount of solid plastic material and/or the weight of the solid plastic material fed in the melting chamber; and/or ambient sensors provided for detecting ambient temperature and/or humidity; and/or operation sensors provided for detecting one or several of the following parameters:
- relative position of the portion of the sonotrode with respect to the melting chamber;
- temperature of the sonotrode;
- temperature of the portion of the sonotrode;
- temperature of the melting chamber;
- temperature of the molding cavity;
- temperature of the plastic material.

3. The device according to claim 1, wherein the electronic control device controls actuators which allow regulating, based at least on the data provided by at least one of said resistance sensors, feed sensors, ambient sensors or operation sensors, one or several of the following operating parameters of the device:
- activation of the sonotrode;
- relative position of the portion of the sonotrode with respect to the melting chamber upon activating vibration of the sonotrode;
- activation time of the sonotrode;
- vibration frequency of the sonotrode;
- vibration amplitude of the sonotrode;
- relative movement speed of the portion of the sonotrode with respect to the melting chamber;
- acceleration of the relative movement of the portion of the sonotrode with respect to the melting chamber;
- pressure applied on the plastic material contained in the melting chamber by the relative movement of the portion of the sonotrode with respect to the melting chamber;
- activation of cooling means.

4. The device according to claim 1, wherein:

the electronic control device has a user interface allowing an operator to enter in said electronic control device information relating to the type of plastic material and/or the format of the plastic material to be used; and the electronic control device regulates the variables and operating parameters of the device also based on the information entered by the operator.

5. The device according to claim 4, wherein:

the electronic control device has a memory in which there are stored variables and operating parameters relating to one or several of the following elements: types of plastic material, different usable formats of said solid plastic material, the geometry of said outlet opening providing an inlet into said molding cavity, or the geometry of the molding cavity, and the electronic control device links and regulates the variables and operating parameters of the device also based on the information contained in said memory.

6. The device according to claim 1, wherein the translation means are electrically actuated, and the resistance sensors detect the power consumption of said translation means during actuation thereof.

* * * * *